United States Patent
Sendonaris et al.

(10) Patent No.: US 9,897,684 B2
(45) Date of Patent: *Feb. 20, 2018

(54) SYSTEMS AND METHODS FOR ESTIMATING A POSITION OF A RECEIVER IN A NETWORK OF BEACONS

(71) Applicant: NextNav, LLC, Sunnyvale, CA (US)

(72) Inventors: Andrew Sendonaris, Los Gatos, CA (US); Jagadish Venkataraman, San Jose, CA (US); Chen Meng, Beijing (CN)

(73) Assignee: NextNav, LLC, Sunnyvale, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/072,809

(22) Filed: Mar. 17, 2016

(65) Prior Publication Data

US 2016/0216361 A1 Jul. 28, 2016

Related U.S. Application Data

(63) Continuation of application No. 14/207,448, filed on Mar. 12, 2014, now abandoned, and a continuation of application No. 14/207,374, filed on Mar. 12, 2014, now Pat. No. 9,322,900.

(60) Provisional application No. 61/786,550, filed on Mar. 15, 2013.

(51) Int. Cl.
*G01S 5/02* (2010.01)
*H04W 64/00* (2009.01)

(52) U.S. Cl.
CPC .............. *G01S 5/0294* (2013.01); *G01S 5/02* (2013.01); *G01S 5/0226* (2013.01); *H04W 64/00* (2013.01)

(58) Field of Classification Search
CPC ....... H04W 4/02; H04W 4/021; H04W 4/023; G01S 19/38

See application file for complete search history.

(56) References Cited

U.S. PATENT DOCUMENTS

| | | | | |
|---|---|---|---|---|
| 6,894,645 B1* | 5/2005 | Akopian | ................. | G01S 19/25 342/357.48 |
| 7,616,156 B2* | 11/2009 | Smith | ..................... | G01S 5/021 342/451 |
| 2013/0271324 A1* | 10/2013 | Sendonaris | ............... | G01S 5/02 342/450 |
| 2014/0266910 A1* | 9/2014 | Gates | ..................... | G01S 19/42 342/458 |

* cited by examiner

*Primary Examiner* — Thomas Lett

(57) ABSTRACT

Systems and methods for estimating a position of a receiver within a venue using localized networks of beacons. Certain aspects relate to different configurations of networks. Other aspects relate to estimating the position of the receiver when the receiver approaches an edge of a localized network of beacons.

23 Claims, 6 Drawing Sheets

SYSTEMS AND METHODS FOR ESTIMATING A POSITION OF A RECEIVER IN A NETWORK OF BEACONS

RELATED APPLICATIONS

This application relates to U.S. Patent Application No. 61/786,550 (filed Mar. 15, 2013, entitled PERFORMANCE ENHANCEMENTS FOR LOCAL NETWORK OF BEACONS), Ser. No. 14/207,374 (filed Mar. 12, 2014, entitled PERFORMANCE ENHANCEMENTS FOR LOCAL NETWORK OF BEACONS), and Ser. No. 14/207,448 (filed Mar. 12, 2014, entitled PERFORMANCE ENHANCEMENTS FOR LOCAL NETWORK OF BEACONS), the contents of which are hereby incorporated by reference herein in their entirety.

FIELD

Various embodiments relate to wireless communications, and more particularly, to networks, devices, methods and computer-readable media for estimating the position of a receiver using a localized network of beacons.

BACKGROUND

It is desirable to estimate the position (or "location") of persons and things in a geographic area with a reasonable degree of accuracy. Accurate estimations of a position can be used to speed up emergency response times, track business assets, and link a consumer to a nearby business. Various techniques are used to estimate the position of an object (e.g., a receiver), including trilateration, which is the process of using geometry to estimate a location of an object using distances traveled by different signals that are received at a location of the object, where the signals are transmitted from geographically-distributed beacons. Reliable distance measurements between the object and beacons are often not possible when the object is in an indoor environment, since signals from outdoor beacons are never received or are received only after traveling extended distances while reflecting off of many surfaces. The lack of reliable distance measurements typically results in imprecise estimates of the object's position within the venue, which sometimes erroneously place the object outside the venue.

Other issues arise when an object approaches the edge of a beacon network, which may frequently occur in a localized network of beacons that covers a small, localized area (e.g., the inside of a building). When the object is close to a boundary/edge of the localized area, an "edge effect" taints the accuracy of position estimates. Thus, detecting when the object is at or near the edge of the localized area becomes critical, as does estimating the object's position without rely only on the beacon network.

Accordingly, there is a need for improved techniques of locating objects using a localized beacon network in localized areas (e.g., indoor environments).

SUMMARY

Certain embodiments of this disclosure relate generally to networks, devices, methods and computer-readable media for estimating one or more positions of a receiver in a network of beacons. Such networks, devices, methods and computer-readable media may determine a first position estimate of a receiver based on a first set of range measurements corresponding to a network of beacons, and set a current position of the receiver to the first position estimate. At a later time, a second position estimate of the receiver may be determined based on a second set of range measurements corresponding to the network of beacons. A determination may then be made as to whether the second position estimate is within a predefined area associated with the network of beacons. When the second position estimate is inside the predefined area, the current position of the receiver is set as the second position estimate. When the second position estimate is not inside the predefined area, a third position estimate of the receiver is determined based on the first position estimate and a first measurement of velocity associated with a first movement of the receiver, and the current position of the receiver is set as the third position estimate.

DETAILED DESCRIPTION

Network of Local Beacons

Figure 1:
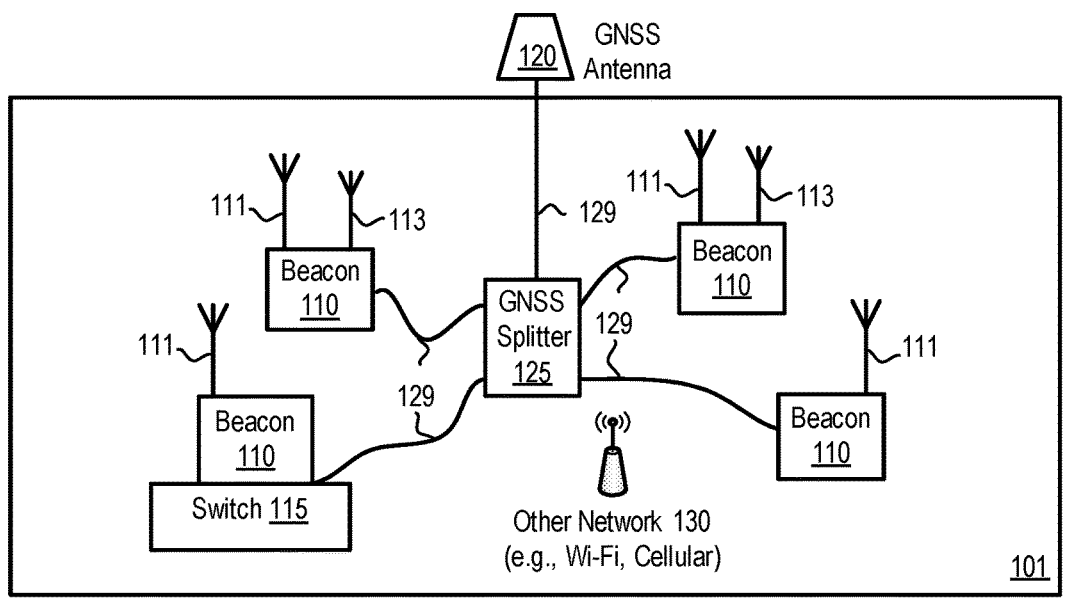
FIG. 1 depicts aspects of a first localized beacon architecture.

Various aspects of this disclosure relate to a localized set of beacons at an indoor or outdoor venue (e.g., one or more building(s), an amusement park, or other venues). The beacons may be deployed as a standalone network or as a part of a larger network to improve positioning services at that venue.

Characteristics of the localized beacon network may vary depending on the venue. Some common characteristics may include: use of an optimal number of beacons that are focused to radiate within that venue at low power (e.g., 100 mW up to 1 W, PA output power); use of antennas that are typically mounted in ceilings or side walls, but may be mounted at all heights of a venue for spatial diversity; use of a group of beacons that form a network among themselves to exchange information about each other either (e.g., through a network operations center (NOC) or through a local network); and installation of beacons for good positional geometry.

Synchronized timing may be accomplished conceptually by having all localized beacons independently synchronized to GNSS directly with a GNSS antenna attached to each beacon. However, this approach comes with the difficulty of GNSS distribution to each beacon which can be cumbersome.

One alternative, as described in more detail below, is for one or more of the beacons to be synchronized to GNSS and then use a timing distribution network to synchronize all other beacons to one of the synchronized beacons.

Another alternative would be for one or more of the localized "master" beacons to be synchronized to another network using the signals received from that network, and then using a timing distribution network to synchronize all other beacons to one of the synchronized "master" beacons. The timing distribution may be accomplished by having each localized beacon listen to the localized master beacon transmission using a receiver, and then adjust its timing according to timing signal transmitted by the localized master beacon.

Another alternative for timing distribution is for the master beacon to distribute a timing signal pulse (e.g., a pulse per second/PPS) to other beacons. Timing can also be distributed between beacons using a precise version of the IEEE 1588 precision time protocol.

In all of the architectures described above, a remote radio head can be deployed such that the beacon sends out digital signals to a radio/head antenna using a fiber optic cable. The remote radio head/antenna, which may house a power amplifier module, converts the digital signals into analog and RF signals in order to deliver information to the antenna. The remote radio head helps reduce deployment cost and helps reduce power consumption in some embodiments. The local beacon network may also coexist with cellular DAS systems in terms of sharing antennas, power and other resources.

It is contemplated that some installations may use one or more telemetry modems/antennas (e.g., cellular, Wi-Fi, other) per beacon, and in some installations, all the beacons may share the same connectivity link to the network operations center (NOC).

It is further contemplated that the timing performance in the local network of beacons is similar or better than an associated wide area network—e.g., like the network described in U.S. Pat. No. 8,130,141, which is incorporated herein in its entirety and for all purposes, except where its content conflicts with the content of this disclosure. Transmissions can be orthogonal to the wide area network in terms of network resources (e.g., PRN, slot and frequency offset) or re-use the same network resources (e.g., PRN, slot, frequency offset) when a wide area network exists. Alternatively, the local network may operate as an independent network in a different frequency band.

A venue may have any number of local network sensors (e.g., temperature, pressure, humidity, gas, acoustic, or other sensors) that may take localized measurements, and correlate those measurements with corresponding readings at a receiver to decrease error along any coordinate (e.g., latitude, longitude, altitude). For example, matches or similarities between sensor readings at the network sensors and a receiver may be used to reduce the possible candidates of estimated position to those located within a known region around particular network sensors. Historical sensor readings may also be captured to map conditions at particular locations for given times, days and seasons. The mapped conditions may then be used to further enhance position processing. Alternative sensors are contemplated, including RFID sensors that may also be distributed throughout a venue, where sensing of the receiver's general location may occur by the RFID units sensing the receiver, or the receiver sensing the RFID units. Different RFID units may be associated with different sensing ranges to further refine trilateration using the RFID units.

Each beacon location may be correlated to characteristics of the venue (e.g., floor number at which beacon is located, relative locations of other beacons, altitude at which beacon is located, section of floor at which beacon is located, typical atmospheric conditions for particular periods of time throughout the year, and other characteristics). A GNSS unit on top of the venue may determine a latitude and longitude that can be correlated with stored data relating to the venue. Information about the venue (e.g., its physical boundaries, locations of beacons) may be identified and used to reduce position error.

The localized beacons may also use a localized coordinate system with the receiver translating the localized coordinates into standard Latitude, Longitude and Altitude (LLA).

For more details relating to the preceding disclosure, attention is now drawn to the figures and the following description.

Network Configuration

In FIG. 1, a GNSS antenna 120 is positioned outside a venue 101 (e.g., on top of a building). Signals received by the GNSS antenna 120 are communicated to multiple distribution points after adequate amplification using wired or wireless technologies (e.g., a coax cable). As shown, information from the GNSS antenna 120 is distributed to multiple beacons 110 via communication links 129 through a GNSS splitter 125. The GNSS antenna 120 maybe dropped from the ceiling to control units of the beacons 110 are located in close proximity to a local network antenna 111 or another antenna 113 corresponding to another network 130, such as a cellular, Wi-Fi, or other network. Alternatively, while not shown, the beacons 110 may be positioned outside the venue 101 (e.g., on the roof) while the antennas are positioned inside the venue 101 at different locations. Communication links may connect the beacons 110 to the antennas 111, 113. The communication links may be wired (e.g., cables) or wireless, which may potentially require local power to the antennas 111, 113 in order to connect the beacons 110 to the antennas 111, 113. Each beacon 110 may have an individual telemetry connection back to a network operations center (NOC) for remote monitoring.

Figure 2:
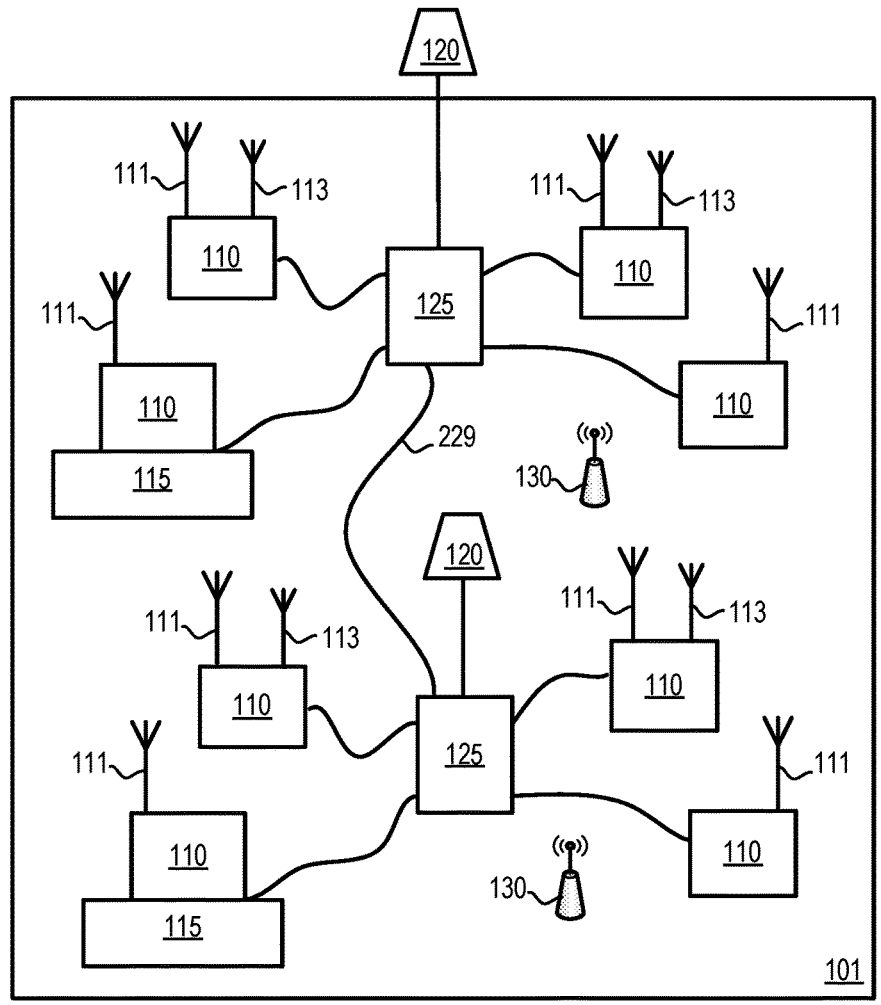
FIG. 2 depicts aspects of a second localized beacon architecture.

FIG. 2 depicts a larger deployment of localized beacons where two groups of localized beacons are installed because each group is limited by the number and length of GNSS distribution points available. Each group can communicate with each other to exchange information based on a wired or wireless communication link 229.

Intra-Beacon Connection

Figure 3:
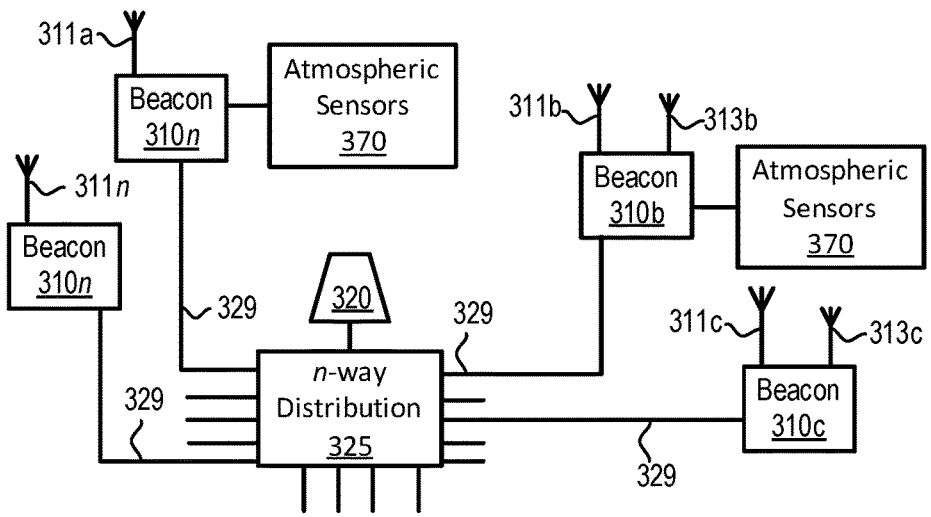
FIG. 3 depicts aspects of a first intra-beacon connection.

Attention is now drawn to FIG. 3, which depicts a network of beacons 310a-n and a localized, n-way distribution component 325 that is coupled to a GNSS antenna 320. Each beacon 310 is connected to the n-way distribution component 325 using an a wired and/or wireless communication link 329 (e.g., an Ethernet link) establishing an intra-beacon network connection for exchange of atmospheric information from one or more atmospheric sensors 370 (e.g., pressure, temperature, humidity, other atmospheric sensors), timing information (e.g., GNSS timing information), and other information among the beacons 310 (and other components in the network, which are not shown). One advantage of this approach is its low installation costs because it avoids installing expensive telecommunications modems and data connectivity to network operations center (NOC) for data exchange between the beacons.

Figure 4:
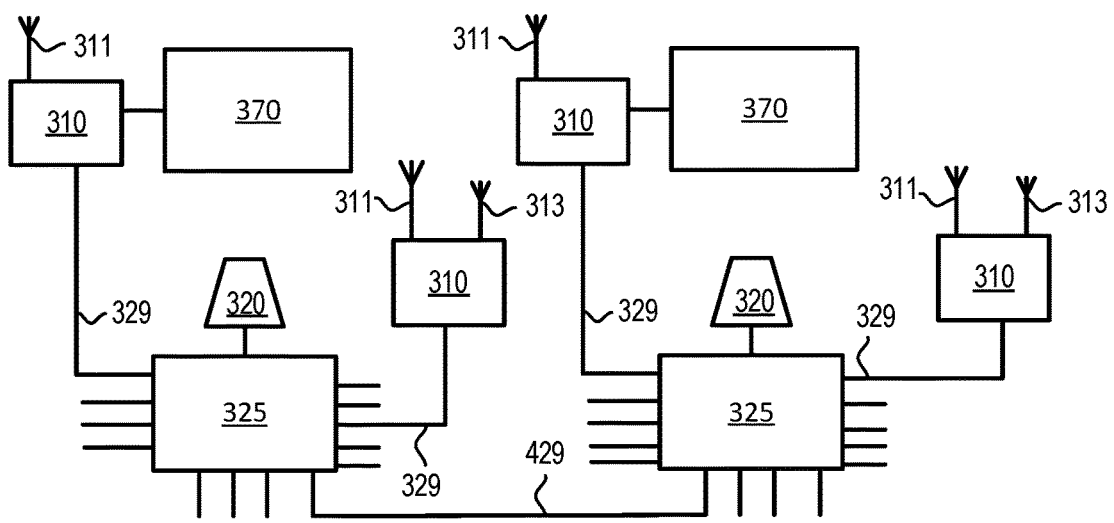
FIG. 4 depicts aspects of a second intra-beacon connection.

FIG. 4 depicts a larger deployment of localized beacons, where two groups of localized beacons are installed. Each group can communicate with each other to exchange information based on a wired or wireless communication link 429

Figure 5:
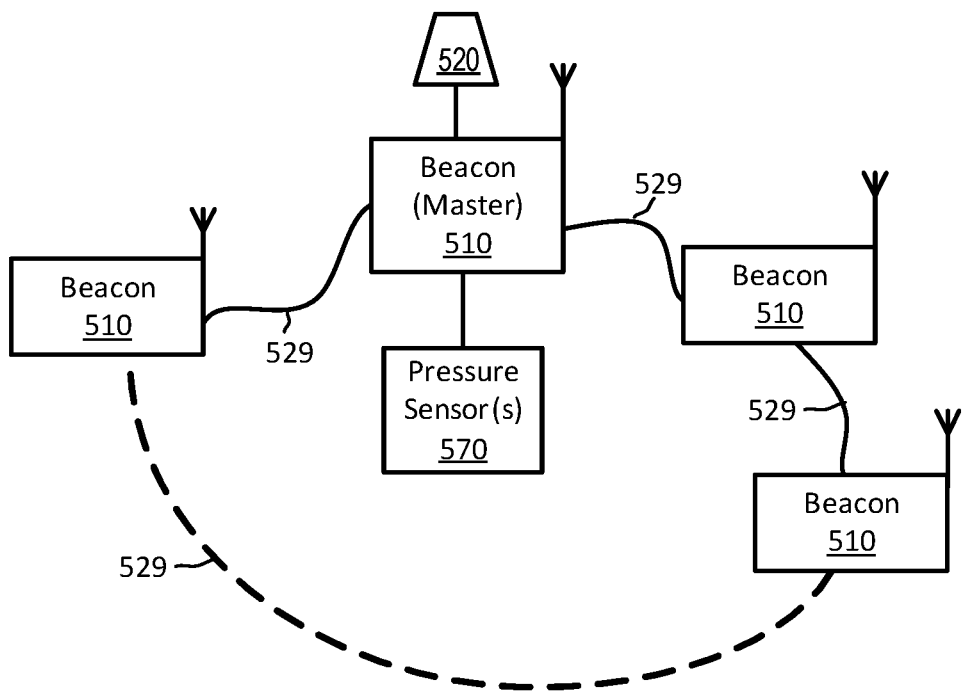
FIG. 5 depicts aspects of a ring connection topology.

FIG. 5 illustrates that timing and message exchange may be distributed through a ring network topology comprising communication links 529 disposed between different components.

Multi-Antenna Configuration

Figure 6:
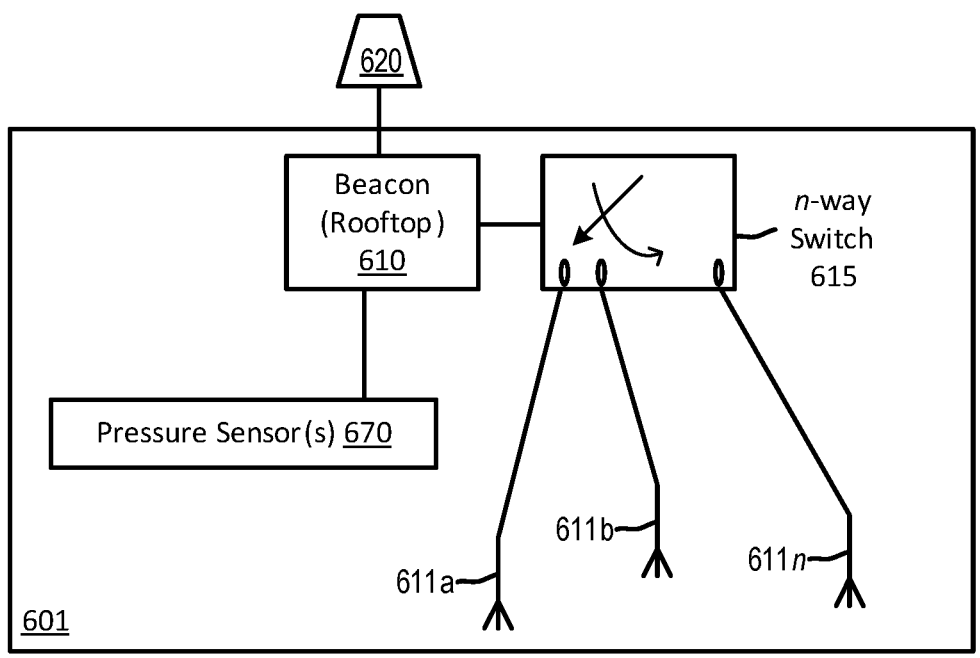
FIG. 6 depicts aspects of a first multi-antenna configuration.

In yet other configurations, as shown in FIG. 6, one beacon 610 may include or couple to an n-way switch 615 that drives several antennas 611a-n in different time slots. It is noted that disclosure relating to networks of beacons extends to a network of antennas that are controlled by one beacon or any number of beacons.

In some cases, a localized beacon network may be a TDMA network, in which case it may be desirable to have one beacon (e.g., beacon 610) generate signals for various time slots, for example, n=10 time slots. This can be accomplished by using an RF switch (e.g., switch 615) to switch the signal across 10 antennas. One advantage of this approach is to reduce the system cost, because it replaces 10 beacons which reduces multiple cable runs. Another advantage is to reduce timing uncertainty, since all 10 signals come from one source.

Bounding Box Constraint for Localized Beacon Network

Various techniques are used to estimate the position of a receiver, including trilateration, which is the process of using geometry to estimate a location of the receiver using distances (or "ranges") traveled by different "ranging" signals that are received by the receiver from different beacons. If the time of transmission of a ranging signal from a beacon and the reception time of the ranging signal are known, then the difference between those times multiplied by speed of light would provide an estimate of the distance traveled by that ranging signal. These distance estimates are often referred to as "range measurements". In most cases, the range measurements are not equal to the actual ranges (i.e., shortest distances) between the beacons and the receiver, mainly because the ranging signals reflect off of objects disposed between the beacons and the receiver. Consequently, the estimate of the receiver's position, when based on the range measurements, is not necessarily equal to the actual position.

Trilateration estimates the receiver's position based on geometric relationships among the distances traveled by ranging signals to the receiver from beacons at different positions—e.g., the estimate is often based on where the measured ranges intersect. In most cases, more accurate estimates are determined when ranging signals are received from beacons that are geographically distributed around a receiver, such that an inaccurate range measurement from one direction is counter-balanced by a range measurement from another direction. However, as the receiver approaches a boundary/edge of a beacon network, ranging signals are typically received from beacons that are not geographically distributed around a receiver (i.e., no range measurements are available from particular directions). In this case, an inaccurate range measurement from one direction may result in a position estimate that is far away from the actual position of the receiver since no opposing range measurement was received. Consequently, an estimate of a receiver's position may be significantly inaccurate near the edge of the beacon network. Such issues are less problematic for a wide area beacon topology, which has a much larger coverage area that provides better geographic distribution of beacons around most possible locations of receivers. By contrast, these issues are problematic in a localized beacon topology, which has a smaller coverage area that is constrained by geographic parameters of a venue (e.g., a shopping mall, an airport, a school), within which the beacons are placed. In localized networks, inaccurate range measurements from one direction, without the presence of counter-balancing range measurements from another direction, may result in a position estimate that falls outside the venue even when the receiver is in the venue. Accordingly, solutions are needed to provide accurate estimates of a receiver's position at the edges of a localized beacon network. Such solutions are discussed below.

A positioning engine is typically used to compute an estimate of a receiver's position. The position engine includes a tracking filter such as a Kalman filter, which operates under an assumption that the receiver is always present within a 2-dimensional or 3-dimensional convex hull (or "bounding box") formed by the network of beacons that transmit the ranging signals used to compute the position estimate. The bounding box of the localized beacon network can be determined using the known locations of the beacons, the coverage area of the beacons, and/or the physical boundaries of the venue, as described later.

When the assumption that the receiver is always in the bounding box is violated, the tracking filter may suffer from divergence. Whenever the receiver moves towards the edges of the bounding box created by the local network of beacons, there is a high likelihood that noise in the tracking position filter, multipath biases in range measurements, or other issues can momentarily cause the tracking filter's position estimate to fall outside the bounding box. When this happens, the tracking position filter can diverge. This phenomenon is explained in the context of a Kalman filter, but it can be applied to other position filters as well.

When the receiver is inside the bounding box, the effects of receiver clock bias and receiver motion on the various parameters affecting the state of the filter are different enough that the filter can distinguish between the clock bias and receiver motion. Therefore, clock bias is estimated as such and does not result in erroneously estimating receiver motion. However, when the receiver's estimated position is outside the bounding box, the receiver clock drift can be confused as receiver motion, in which case the position estimate starts to drift further and further outside the bounding box. In order to avoid this problem, the following solution is proposed, which considers the bounding box formed by the beacon network.

It may be initially assumed that the Kalman filter is in steady state, and is providing fixes within the bounding box. As the receiver moves towards the edge of the beacon network, a position fix may fall outside the bounding box, which may be determined by comparing position coordinates of the position fix with a range of position coordinates of the bounding box. Upon determining that one of the fixes has fallen outside the bounding box, the Kalman filter may be set in a "hold-over" mode. Upon entering the hold-over mode, the Kalman filter may ignore additional range measurements it receives from the beacons until received range measurements produce a position estimate that falls inside the bounding box.

During the hold-over mode, the Kalman filter may continue to propagate the receiver's position using measurements from sensors at the receiver (e.g., inertial sensors that measure direction, speed, and other movements). For example, the last estimated position of the receiver that fell within the bounding box may be used as a starting point, and new estimates of position may be made using velocity (i.e., speed and direction). Other sources of information—e.g., from another network, such as Wi-Fi, or peer-to-peer/receiver-to-receiver networks—may be used where the location and the range of that network's beacons are known, the measurements of which can be correlated to a map of the venue to further refine the position estimate of the receiver during the hold-over mode.

The filter continues in hold-over until it receives a set of range measurements that cause the receiver's estimated position to fall back inside the bounding box. Once this occurs, the filter exits hold-over mode, and once again tracks position estimates using range measurements.

It is noted that the Kalman filter cannot afford to be in a hold-over mode for extended periods of time, since the propagated position estimates based on sensor measurements may not be applicable beyond some time period (e.g., a few seconds, under a minute, a few minutes). To avoid this situation, an internal counter is initialized to some value (e.g., zero or a maximum number) every time the filter enters the hold-over mode. This counter is incremented or decremented as long as the filter ignores the range measurements from the beacons—i.e., as long as position fixes based on the range measurements fall outside the bounding box. If the filter has not exited the hold-over mode when the counter value reaches a threshold condition, the state vector of the Kalman filter is reset entirely (e.g., the filter discards all of the historic range measurement information it has accrued until that point before starting over). If future position estimates continue to fall outside the bounding box, the Kalman filter will continue to reset until it receives a set of measurements that cause the position estimate to fall inside the bounding box.

In some embodiments, the counter value is changed each time a position estimate is determined using sensor measurements. In other embodiments, the counter value is changed after some predefined period of elapsed time. The threshold condition may be based on the counter reaching a predefined threshold value. In some embodiments, the threshold value is based on a number of consecutive position estimates (based on range measurements) that fall outside the bounding box (or a number of consecutive position estimates that are based on the sensor measurements). Alternatively, the threshold value may be based on elapsed time.

During the hold-over mode, the Kalman filter estimates possible positions of the receiver. Usually, given inaccurate sensor measurements and other factors, each consecutive estimate becomes increasingly inaccurate with time.

It is noted that, from second to second, the Kalman filter predicts its new state based on its existing state. A noise term called the "process noise" is associated with this prediction. The process noise indicates the level of trust the filter has in its previous state estimate. As the Kalman filter spends increasingly more time in a hold-over mode, the magnitude of the process noise is gradually increased indicating to the filter that the propagated state is losing its quality with time. Eventually, the filter will be reset if the holdover mode is not exited within some time period, or before the value of the process noise reaches a threshold value. It is contemplated that, instead of comparing a counter value to a threshold condition after each estimate that is based on sensor measurements, the process noise can be compared to a threshold condition (e.g., a maximum value) after each estimate that is based on sensor measurements.

Figure 7:
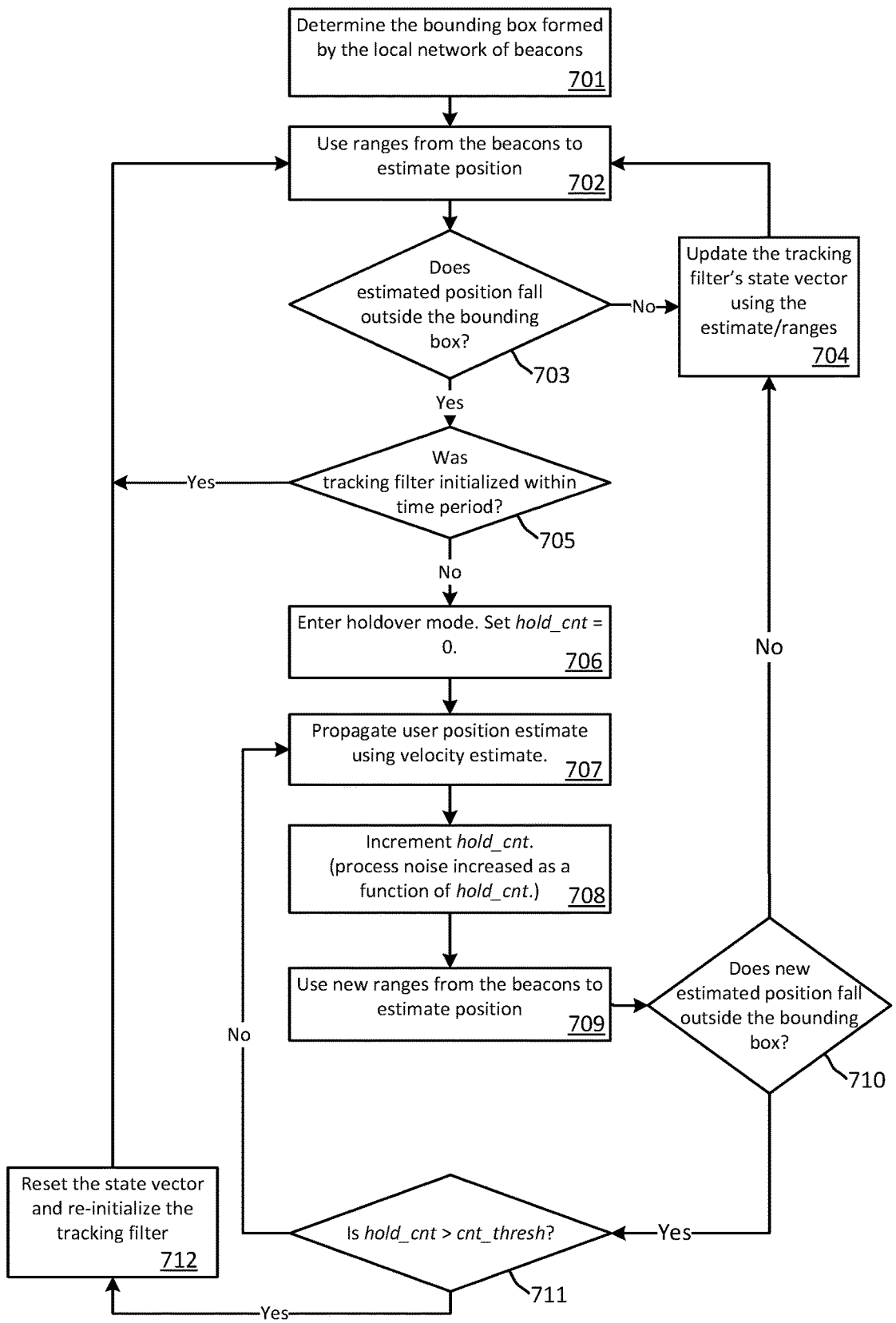
FIG. 7 illustrates a process for determining when to start and stop a hold-over mode.

By way of example, FIG. 7 illustrates one process for determining when to use the hold-over mode. When setting up a local network of beacons in a venue, a bounding box is determined based on geographic parameters of the venue and/or the beacons (701). Additional details regarding different bounding boxes are provided later.

At a first instance in time, range measurements are determined from ranging signals received by a receiver from different beacons in the network. Those range measurements are then used to compute an estimate of the receiver's position in the network at the first instance in time (702). The estimate of the receiver's position at the first instance of time is compared to the bounding box, and a determination is made as to whether that estimated position falls outside the bounding box (703). If the estimated position does not fall outside the bounding box (i.e., it is within the bounding box), then the estimated position is used to replace a previous estimate of the receiver's position (704), and another estimate of the receiver's position is determined at a later time (702). When the estimated position falls outside the bounding box, the status of the tracking filter is optionally determined (e.g., whether the tracking filter was initialized within a predefined time period) (705). If the tracking filter was recently initialized, another estimate of the receiver's position is optionally determined using new range measurements at a later time (702). If the tracking filter was not recently initialized, or simply if the estimated position falls outside the bounding box, the tracking filter enters a hold-over mode, and a counter is set to an initial value (e.g., zero, or any suitable value depending on whether the counter is decrementing or incrementing) (706).

In hold-over mode, the velocity of the receiver since the previous estimate of the receiver's position is determined, and the velocity is used, along with the previous estimate of the receiver's position, to estimate the position of the receiver (707). The velocity estimate may define distance(s) and heading(s) traveled by the receiver. Once known, the distance(s) and heading(s) can be added to the previous estimate of the receiver's position to estimate the position of the receiver. The value of the counter is also incremented or decremented depending on the implementation (708).

At another instance in time, range measurements are determined, and used to estimate the receiver's position at that other instance in time (709). The estimate of the receiver's position at the other instance of time is compared to the bounding box, and a determination is made as to whether that estimated position falls outside the bounding box (710). If the estimated position does not fall outside the bounding box (i.e., it is within the bounding box), then the estimated position is used to replace a previous estimate of the receiver's position (e.g., an estimate based on velocity from an earlier instance in time) (704). When the estimated position falls outside the bounding box, operations 707 through 710 are repeated so long as the value of the counter has not reached a threshold value (711). If the value of the counter has not reached a threshold value, the tracking filter is re-initialized (712), and operation 702 is started.

Use of the methods above can alleviate the edge effects of network development and avoid divergence of the Kalman filter by setting the Kalman filter in a hold-over mode for a certain time period even when its process noise is increased during that time period. The hold-over mechanism can be supplemented by resets to the filter and a potential placement of the receiver's position estimate to the targeted region's edges when deemed necessary.

It is noted that a "bounding box" specifies boundaries within which all things lie. It may take on any shape depending on the things that fall within the "box". A bounding box can be thought of as a defined area with boundaries, where the area is defined in multiple dimensions—e.g., latitude, longitude, altitude, and time (in the case where the boundaries of the area change).

Figure 8A:
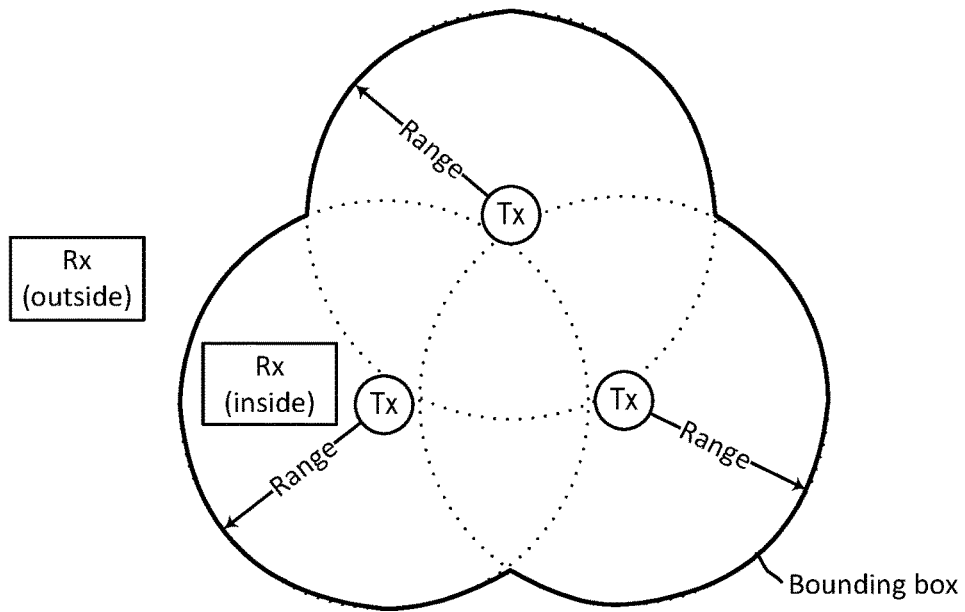
FIG. 8A and FIG. 8B illustrate coverage areas for beacons.
Figure 8B:
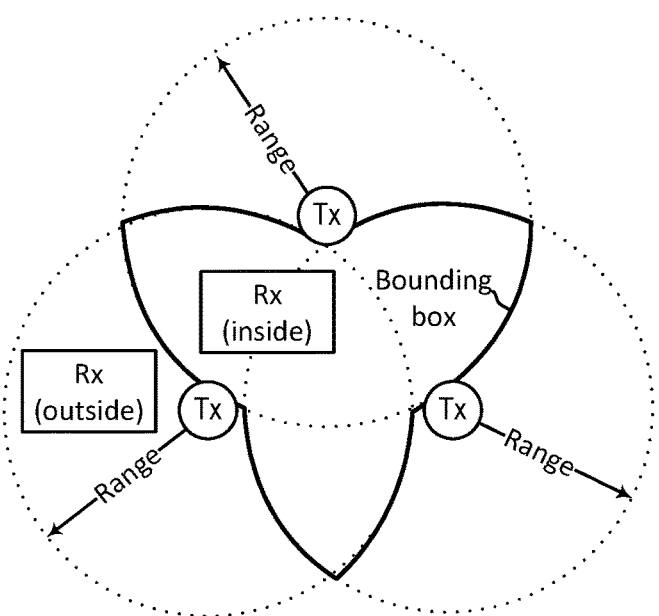

In the case of a network of beacons, the bounding box may correspond to the edges of coverage area for each beacon in the network, as illustrated in FIG. 8A. Alternatively, the bounding box may correspond to edges of overlapping coverage areas for n beacons, as illustrated in FIG. 8B, where n=2. Of course, bounding boxes may be defined more narrowly. Moreover, the bounding box may change over time depending of the status of network resources.

A bounding box may be constrained to physical boundaries of a venue, such as a wall of a building that would prevent a receiver from existing the building to an estimated position that falls outside that building's wall. Thus, knowledge of the physical parameters of a venue, in addition to or as an alternative to coverage parameters of the network, may be used to determine the boundaries of a bounding box. Once boundaries of a bounding box are known, it is possible to compare a position estimate corresponding to a receiver to geographic parameters corresponding to the boundaries of the bounding box. For example, comparisons could be made between latitude, longitude and/or altitude of the estimated position to sets of latitude, longitude and/or altitude. The comparison could determine whether the estimated position falls within the geographic parameters.

Additional Methodologies

Functionality and operation disclosed herein may be embodied as one or more methods implemented by processor(s) at one or more locations. Non-transitory processor-readable media embodying program instructions adapted to be executed to implement the method(s) are also contemplated. The program instructions may be contained in at least one semiconductor chip.

By way of example, not by way of limitation, method(s) may comprise: determining a first position estimate of a receiver based on a first set of range measurements corresponding to a network of beacons; setting a current position of the receiver to the first position estimate; determining a second position estimate of the receiver based on a second set of range measurements corresponding to the network of beacons; and determining whether the second position estimate is within a predefined area associated with the network of beacons. When the second position estimate is inside the predefined area, method(s) may further or alternatively comprise: setting the current position of the receiver as the second position estimate. When the second position estimate is not inside the predefined area, method(s) may further or alternatively comprise: determining a third position estimate of the receiver based on the first position estimate and a first measurement of velocity associated with a first movement of the receiver, and setting the current position of the receiver as the third position estimate.

After determining the third position estimate, method(s) may further or alternatively comprise: determining a fourth position estimate of the receiver based on a third set of range measurements corresponding to the network of beacons; and determining whether the fourth position estimate is within the predefined area. When the fourth position estimate is inside the predefined area, method(s) may further or alternatively comprise: setting the current position of the receiver as the fourth position estimate. When the fourth position estimate is not inside the predefined area, method(s) may further or alternatively comprise: determining a fifth position estimate of the receiver based on the third position estimate and a second measurement of velocity associated with a second movement of the receiver, and setting the current position of the receiver as the fifth position estimate.

After determining that the second position estimate is not inside the predefined area, method(s) may further or alternatively comprise: incrementing or decrementing a value of a counter. After incrementing or decrementing the counter, method(s) may further or alternatively comprise: determining a fourth position estimate of the receiver based on a third set of range measurements corresponding to the network of beacons; and determining whether the fourth position estimate is within the predefined area. When the fourth position estimate is inside the predefined area, method(s) may further or alternatively comprise: setting the current position of the receiver as the fourth position estimate. When the fourth position estimate is not inside the predefined area, method(s) may further or alternatively comprise: determining whether the value of the counter meets a threshold condition. After determining that the value of the counter does not meet the threshold condition, method(s) may further or alternatively comprise: determining a fifth position estimate of the receiver based on the third position estimate and a second measurement of velocity associated with a second movement of the receiver, and setting the current position of the receiver as the fifth position estimate. After determining that the value of the counter meets the threshold condition, method(s) may further or alternatively comprise: resetting a Kalman filter.

In accordance with some aspects, one or more geographic parameters of the predefined area are compared to one or more position coordinates of the second position estimate to determine whether the second position estimate is within the predefined area. In accordance with some aspects, the one or more geographic parameters include one or more coordinates that fall within the predefined area. In accordance with some aspects, the one or more geographic parameters are based on a coverage area of the network of beacons. In accordance with some aspects, the one or more geographic parameters of the predefined area are based on physical parameters of a building that houses the network of beacons.

In accordance with some aspects, additional position estimates are determined based on additional measurements of velocity until process noise associated with a Kalman filter reaches a pre-determined amount of process noise, at which point the Kalman filter is reset. In accordance with some aspects, additional position estimates are determined based on additional measurements of velocity until a value of a counter reaches a pre-determined threshold value, at which point the Kalman filter is reset. In accordance with some aspects, the third position estimate is further based on a map of a venue within which the network of beacons is resides.

In accordance with some aspects, the network of beacons is disposed inside a building, wherein the network of beacons includes a first beacon that is synchronized to GPS time via a GPS antenna disposed on top of the building, and wherein the network of beacons includes other beacons that synchronize to GPS time based on a timing signal transmitted by the first beacon.

In accordance with some aspects, the network of beacons includes at least one beacon coupled to an n-way switch that sends signals to n antennas in n different time slots.

The method(s) may further or alternatively comprise: comparing atmospheric data from the receiver with atmospheric measurements corresponding to one or more regions of the network of beacons; and identifying a candidate position estimate based on the comparison between the atmospheric data from the receiver and the atmospheric measurements corresponding to the one or more regions of the network of beacons. In some embodiments, the regional atmospheric measurements may be used in addition to measured velocity to determine an estimated position during hold-over mode.

A system for estimating a position of a receiver within a building may comprise: a first beacon positioned within the building, wherein the first beacon synchronizes to timing signals it receives from a GNSS timing receiver that is positioned on top of the building.

The system may comprise: a plurality of antennas distributed throughout the building and coupled to the first beacon, wherein the first beacon generates a plurality of signals corresponding to a plurality of time slots, and wherein each of the signals is transmitted by a different antenna from the plurality of antennas.

The system may comprise: a network of synchronized beacons positioned within the building, wherein the network of synchronized beacons include the first beacon and remaining beacons that synchronize to the timing signals.

In accordance with some aspects, the remaining beacons synchronize to the first beacon based on a local timing signal originating from the first beacon. In accordance with some aspects, the transmission of the local timing signal is orthogonal to transmissions of the timing signals from the GNSS receiver. In accordance with some aspects, the remaining beacons receive the timing signals from the GNSS timing receiver.

The system may comprise: a plurality of atmospheric sensors that measure pressure and temperature within different regions of the building; and one or more processors that compare measurements of pressure and temperature taken at a receiver with pressure and temperature measurements from each of the different regions of the building, wherein the one or more processors determine an position estimate of the receiver based on the comparisons.

In accordance with some aspects, the one or more processors determine that the position estimate is in a first region of the building when a first set of pressure and temperature measurements from the first region best match the measurements of pressure and temperature taken at the receiver relative to pressure and temperature measurements from one or more other regions.

Any portion of the functionality embodied in the method(s) above may be combined with any other portion of that functionality.

Systems that carry out functionality (e.g., embodied as methods) may include one or more devices, including beacon(s) from which position information is sent, receiver(s) at which position information is received, processor(s)/server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of beacons and a server in another country). Additionally, one or more computers may programmed to carry out various methods, and instructions stored on one or more processor-readable media may be executed by a processor to perform various methods.

Example Systems & Other Aspects

It is noted that the terms "beacon" and "transmitter" may refer to the same thing. For example, the transmitter system 900 of FIG. 9 may be used in a beacon.

Figure 9:
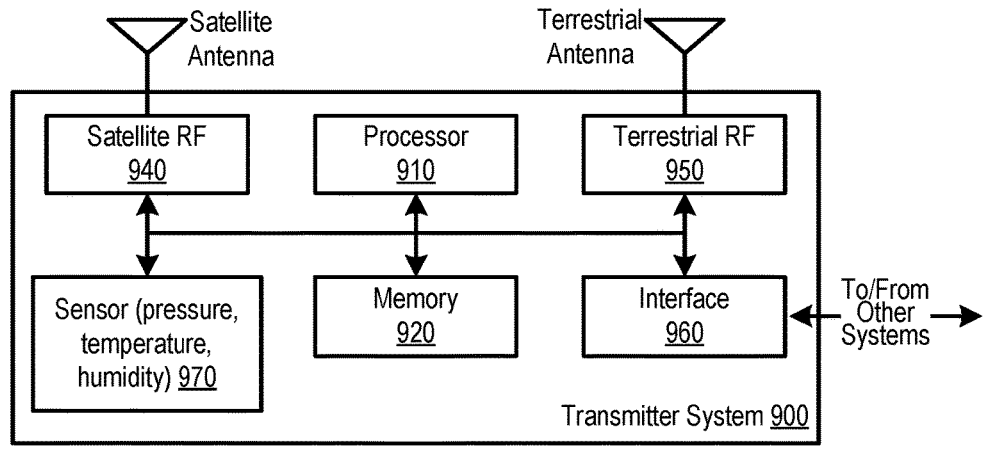
FIG. 9 depicts aspects of a beacon system.

FIG. 9 illustrates details of transmitter system 900 at which signals may be generated and transmitted. Transmitter system 900 may include processor 910 that carries out signal processing (e.g., interpreting received signals and generating transmission signals). One or more memories 920 may provide storage and retrieval of data and/or executable instructions for performing functions described herein. Transmitter system 900 may further include one or more antenna components (e.g., satellite antenna or terrestrial antenna) for transmitting and receiving signals, satellite RF component 940 for receiving satellite signals, from which location information and/or other information (e.g., timing, dilution of precision (DOP), or other) may be extracted, terrestrial RF component 950 for receiving signals from a terrestrial network, and/or for generating and sending output signals, and interface 960 for communicating with other systems. Transmitter system 900 may also include one or more environmental sensors 970 for sensing environmental conditions (e.g., pressure, temperature, humidity, wind, sound, or other), which may be compared to such conditions as sensed at a receiver in order to estimate a position of the receiver based on similarities and differences between the conditions at transmitter system 900 and the receiver. It is noted that transmitter system 900 may be implemented by the transmitters described herein, which may alternatively take on other forms as known by one of skill in the art. Each transmitter system 900 may also include various elements as are known or developed in the art for providing output signals to, and receiving input signals from, the antennas, including analog or digital logic and power circuitry, signal processing circuitry, tuning circuitry, buffer and power amplifiers, and the like.

Figure 10:
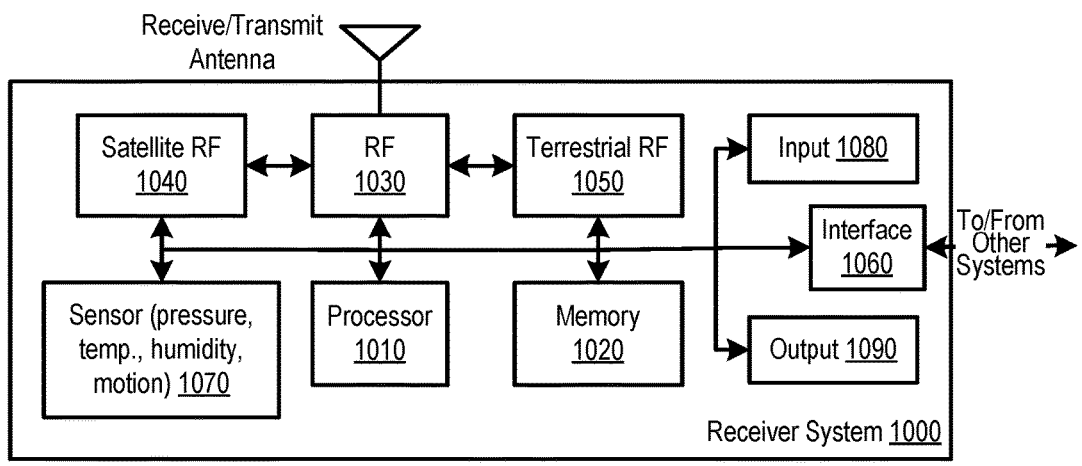
FIG. 10 depicts aspects of a receiver system.

FIG. 10 illustrates details of receiver system 1000, at which signals from transmitters (e.g., transmitter system 900) may be received and processed to extract information used to compute an estimated position of receiver system 1000. Receiver system 1000 may include any of a variety of electronic devices configured to receive RF or other signaling using wireless means (radio frequency, Wi-Fi, Wi-Max, Bluetooth, or other wireless channels as is known or later developed in the art), or wired means (e.g., Ethernet, USB, flash RAM, or other similar channels as is known or later developed in the art). Each receiver system 1000 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to receiver system 1000. As shown, RF component 1030 may control the exchange of information with other systems (e.g., satellite, terrestrial). Signal processing may occur at satellite component 1040, or terrestrial component 1050, which may use separate or shared resources such as antennas, RF circuitry, and the like. One or more memories 1020 may be coupled to a processor 1010 to provide storage and retrieval of data and/or instructions relating to methodologies described herein that may be executed by processor 1010. Receiver system 1000 may further include one or more sensors 1070 for measuring environmental conditions like pressure, temperature, humidity, acceleration, direction of travel, wind force, wind direction, sound, or other conditions. Receiver system 1000 may further include input and output (I/O) components 1080 and 1090, which may include a keypad, touchscreen display, camera, microphone, speaker, or others, which may be controlled by means known in the art. It is noted that receiver system 1000 may be implemented by the receivers described herein, which may alternatively take on other forms as known by one of skill in the art.

In some embodiments, transmitter system 900 and/or receiver system 1000 may be connected, via various wired or wireless communication link, to a server system (not shown), which may receive/send information from/to transmitter system 900 and/or receiver system 1000. The server system may also control operations of transmitter system 900 and/or receiver system 1000. Some or all processing that can be performed at transmitter system 900 and/or receiver system 1000 may alternatively be performed by a one or more processors that are remote from those systems (e.g., in a different city, state, region, or country). Such remote processors may be located at the server system. Thus, processing may be geographically distributed. Processing in one system or component may be initiated by another system (e.g., upon receipt of signals or information from the other system.

The term "ranging signal" includes signals that are used to estimate the distance (also referred to as "range") to a transmitter from a receiver. If the time of transmission of a signal from a transmitter and the reception time of the signal are known, then the difference between those times multiplied by speed of light would provide an estimate of the distance traveled by that signal. These estimates are often referred to as "range measurements".

It is noted that the term "GNSS" or "may refer to any Global Navigation Satellite Systems (GNSS), such as GLONASS, Galileo, and Compass/Beidou, and vice versa.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and receiver, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and be operated from different platforms used by known operating systems. Instructions embodied in firmware can be contained in an integrated circuit or other suitable device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

"Data" and "information" may be used interchangeably. A data source which is depicted as a single storage device may be realized by multiple (e.g., distributed) storage devices. A data source may include one or more types of data sources, including hierarchical, network, relational, non-relational, object-oriented, or another type of data source. As used herein, computer-readable media includes all forms of computer-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

The invention claimed is:

1. A method for estimating one or more positions of a receiver in a network of beacons, the method comprising:
   determining a first position estimate of a receiver based on a first set of range measurements;
   setting a current position of the receiver to the first position estimate;
   determining a second position estimate of the receiver based on a second set of range measurements;
   determining whether the second position estimate is within a predefined area associated with the network of beacons;
   when the second position estimate is inside the predefined area setting the current position of the receiver as the second position estimate; and
   when the second position estimate is not inside the predefined area, determining a third position estimate of the receiver based on the first position estimate and a first measurement of velocity associated with a first movement of the receiver, and setting the current position of the receiver as the third position estimate.

2. The method of claim 1, wherein after determining the third position estimate, the method comprises:
   determining a fourth position estimate of the receiver based on a third set of range measurements;
   determining whether the fourth position estimate is within the predefined area;
   when the fourth position estimate is inside the predefined area setting the current position of the receiver as the fourth position estimate; and
   when the fourth position estimate is not inside the predefined area, determining a fifth position estimate of the receiver based on the third position estimate and a second measurement of velocity associated with a second movement of the receiver, and setting the current position of the receiver as the fifth position estimate.

3. The method of claim 2, wherein additional position estimates are determined based on additional measurements of velocity until process noise associated with a Kalman filter reaches a pre-determined amount of process noise, at which point the Kalman filter is reset.

4. The method of claim 2, wherein additional position estimates are determined based on additional measurements of velocity until a value of a counter reaches a pre-determined threshold value, at which point a Kalman filter is reset.

5. The method of claim 2, wherein the network of beacons includes at least one beacon coupled to an n-way switch that sends signals to n antennas in n different time slots.

6. The method of claim 2, wherein the method further comprises:
   comparing atmospheric data from the receiver with atmospheric measurements from one or more regions of the network of beacons; and
   identifying a candidate position estimate based on the comparison between the atmospheric data from the receiver and the atmospheric measurements from the one or more regions of the network of beacons.

7. The method of claim 1, wherein after determining that the second position estimate is not inside the predefined area, the method comprises: incrementing a value of a counter.

8. The method of claim 7, wherein after incrementing the counter, the method comprises:
   determining a fourth position estimate of the receiver based on a third set of range measurements;
   determining whether the fourth position estimate is within the predefined area;
   when the fourth position estimate is inside the predefined area, setting the current position of the receiver as the fourth position estimate;
   when the fourth position estimate is not inside the predefined area:
      determining whether the value of the counter meets a threshold condition; and
      if the value of the counter does not meet the threshold condition, determining a fifth position estimate of the receiver based on the third position estimate and a second measurement of velocity associated with a second movement of the receiver, and setting the current position of the receiver as the fifth position estimate.

9. The method of claim 7, wherein the method comprises:
   determining whether the value of the counter meets a threshold condition; and
   resetting a Kalman filter after determining that the value of the counter meets the threshold condition.

10. The method of claim 1, wherein the predefined area is defined by a bounding box formed by the network of beacons.

11. The method of claim 1, wherein the third position estimate is further based on a map of a venue within which the network of beacons resides.

12. The method of claim 1, wherein the network of beacons is disposed inside a building, wherein the network of beacons includes a first beacon that is synchronized to GPS time via a GPS antenna disposed on top of the building, and wherein the network of beacons includes other beacons that synchronize to GPS time based on a timing signal transmitted by the first beacon.

13. A system for estimating one or more positions of a receiver in a network of beacons, wherein the system comprises:
   one or more processors; and
   one or more non-transitory processor-readable media storing instructions adapted to cause the one or more processors to perform operations comprising:
      determining a first position estimate of a receiver based on a first set of range measurements;
      setting a current position of the receiver to the first position estimate;
      determining a second position estimate of the receiver based on a second set of range measurements;
      determining whether the second position estimate is within a predefined area associated with the network of beacons;
      when the second position estimate is inside the predefined area, setting the current position of the receiver as the second position estimate; and
      when the second position estimate is not inside the predefined area, determining a third position estimate of the receiver based on the first position estimate and a first measurement of velocity associated with a first movement of the receiver, and setting the current position of the receiver as the third position estimate.

14. One or more non-transitory processor-readable media embodying program instructions that, when executed by one or more processors, cause the one or more processors to perform a method for estimating one or more positions of a receiver in a network of beacons, the method comprising:
   determining a first position estimate of a receiver based on a first set of range measurements;

setting a current position of the receiver to the first position estimate;

determining a second position estimate of the receiver based on a second set of range measurements;

determining whether the second position estimate is within a predefined area associated with the network of beacons;

when the second position estimate is inside the predefined area, setting the current position of the receiver as the second position estimate; and when the second position estimate is not inside the predefined area, determining a third position estimate of the receiver based on the first position estimate and a first measurement of velocity associated with a first movement of the receiver, and setting the current position of the receiver as the third position estimate.

15. The one or more non-transitory processor-readable media of claim 14, wherein after determining the third position estimate, the method comprises:

determining a fourth position estimate of the receiver based on a third set of range measurements;

determining whether the fourth position estimate is within the predefined area;

when the fourth position estimate is inside the predefined area, setting the current position of the receiver as the fourth position estimate; and when the fourth position estimate is not inside the predefined area, determining a fifth position estimate of the receiver based on the third position estimate and a second measurement of velocity associated with a second movement of the receiver, and setting the current position of the receiver as the fifth position estimate.

16. The one or more non-transitory processor-readable media of claim 15, wherein additional position estimates are determined based on additional measurements of velocity until process noise associated with a Kalman filter reaches a pre-determined amount of process noise, at which point the Kalman filter is reset.

17. The one or more non-transitory processor-readable media of claim 15, wherein additional position estimates are determined based on additional measurements of velocity until a value of a counter reaches a pre-determined threshold value, at which point a Kalman filter is reset.

18. The one or more non-transitory processor-readable media of claim 15, wherein the method further comprises:

comparing atmospheric data from the receiver with atmospheric measurements from one or more regions of the network of beacons; and identifying a candidate position estimate based on the comparison between the atmospheric data from the receiver and the atmospheric measurements from the one or more regions of the network of beacons.

19. The one or more non-transitory processor-readable media of claim 14, wherein after determining that the second position estimate is not inside the predefined area, the method comprises:

incrementing a value of a counter.

20. The one or more non-transitory processor-readable media of claim 19, wherein after incrementing the counter, the method comprises:

determining a fourth position estimate of the receiver based on a third set of range measurements;

determining whether the fourth position estimate is within the predefined area;

when the fourth position estimate is inside the predefined area, setting the current position of the receiver as the fourth position estimate;

when the fourth position estimate is not inside the predefined area:

determining whether the value of the counter meets a threshold condition; and if the value of the counter does not meet the threshold condition, determining a fifth position estimate of the receiver based on the third position estimate and a second measurement of velocity associated with a second movement of the receiver, and setting the current position of the receiver as the fifth position estimate.

21. The one or more non-transitory processor-readable media of claim 19, wherein the method comprises:

determining whether the value of the counter meets a threshold condition; and resetting a Kalman filter after determining that the value of the counter meets the threshold condition.

22. The one or more non-transitory processor-readable media of claim 14, wherein the predefined area is defined by a bounding box formed by the network of beacons.

23. The one or more non-transitory processor-readable media of claim 14, wherein the third position estimate is further based on a map of a venue within which the network of beacons resides.

* * * * *